United States Patent

Gorjiara et al.

(10) Patent No.: US 10,453,089 B2
(45) Date of Patent: Oct. 22, 2019

(54) RACE CONDITION AVOIDANCE IN A MULTI-DATABASE ENVIRONMENT

(71) Applicant: Microsoft Technology Licensing, LLC, Redmond, WA (US)

(72) Inventors: Bita Gorjiara, Sunnyvale, CA (US); Xinruo Jing, Foster City, CA (US); Luke Kopakowski, San Francisco, CA (US); Hao Liu, Sunnyvale, CA (US)

(73) Assignee: Microsoft Technology Licensing, LLC, Redmond, VA (US)

( * ) Notice: Subject to any disclaimer, the term of this patent is extended or adjusted under 35 U.S.C. 154(b) by 291 days.

(21) Appl. No.: 15/612,586

(22) Filed: Jun. 2, 2017

(65) Prior Publication Data

US 2018/0349947 A1    Dec. 6, 2018

(51) Int. Cl.
*G06Q 30/02* (2012.01)

(52) U.S. Cl.
CPC ..... *G06Q 30/0244* (2013.01); *G06Q 30/0251* (2013.01)

(58) Field of Classification Search
CPC .................. G06Q 30/0244; G06Q 30/0251
USPC .......................................... 705/14.43, 14.49
See application file for complete search history.

(56) References Cited

U.S. PATENT DOCUMENTS

| | | | |
|---|---|---|---|
| 2007/0174118 A1* | 7/2007 | Dekel ................ | G06Q 30/02 705/14.54 |
| 2011/0161161 A1* | 6/2011 | Juda ................. | G06Q 30/02 705/14.42 |
| 2018/0336589 A1* | 11/2018 | Ye ................... | G06Q 30/0251 |

* cited by examiner

*Primary Examiner* — Scott D Gartland
(74) *Attorney, Agent, or Firm* — Hickman Palermo Becker Bingham LLP; Daniel D. Ledesma (57) ABSTRACT

Techniques for avoiding race conditions in a content delivery system are provided. Multiple content delivery campaigns that are affected by at least one remapping in a set of remappings are identified. Each remapping in the set of remappings maps an old identifier to a new identifier that is different than the old identifier. For at least some of the plurality of content delivery campaigns, identification data that identifies the content delivery campaign is sent to a particular service. In response to the particular service receiving the identification data, the particular service retrieves targeting data associated with the content delivery campaign. The particular service applies a subset of the set of remappings to the targeting data to generate updated targeting data. The particular service causes the updated targeting data to be stored in association with the content delivery campaign.

16 Claims, 5 Drawing Sheets

RACE CONDITION AVOIDANCE IN A MULTI-DATABASE ENVIRONMENT

TECHNICAL FIELD

The present disclosure relates to computing systems and databases and, more particularly, to avoiding race conditions when updating multiple databases.

BACKGROUND

Computer systems vary in complexity in terms of the number of machines in a computer system, the communication among the machines in the computer system, and the code that executes on each machine. The more complex a computer system, the more likely that race conditions will arise. A race condition is an undesirable situation that occurs when a device or system attempts to perform two or more operations at the same time, but due to the nature of the device or system, the operations must be done in the proper sequence in order to be done correctly.

One complication arises when remote users of the system are accessing and updating data while the system is attempting to change the same data. While preventing remote access may appear like a reasonable solution, such a practice results in poor user experience and, consequently, an increased likelihood that users will stop utilizing the system.

Another complication arises when multiple databases need to be updated simultaneously. If not done correctly, then, due to the relationship between the data in the respective databases, content mismatches will result, signaling poor system performance. Techniques for updating multiple databases in a way to eliminate one or both of these complications would be beneficial.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

System Overview

Figure 1:
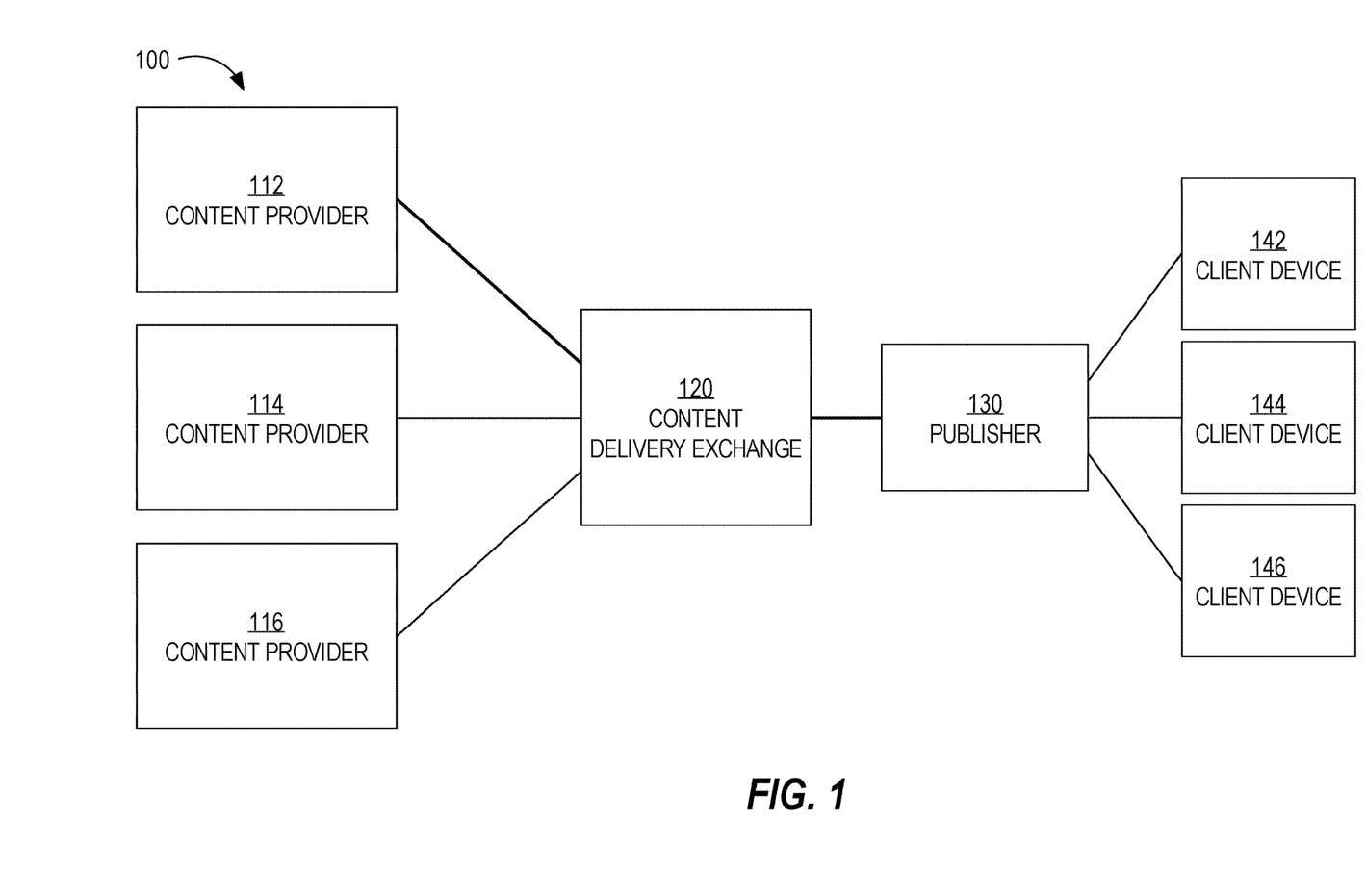
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery exchange 120, a publisher 130, and client devices 142-146. Although three content providers are depicted, system 100 may include more or less content providers. Similarly, system 100 may include more than one publisher and more or less client devices.

Content providers 112-116 interact with content delivery exchange 120 (e.g., over a network, such as a LAN, WAN, or the Internet) to enable content items to be presented, though publisher 130, to end-users operating client devices 142-146. Thus, content providers 112-116 provide content items to content delivery exchange 120, which in turn selects content items to provide to publisher 130 for presentation to users of client devices 142-146. However, at the time that content provider 112 registers with content delivery exchange 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery exchange 120.

Although depicted in a single element, content delivery exchange may comprise multiple computing elements and devices, connected in a local network or distributed regionally or globally across many networks, such as the Internet. Thus, content delivery exchange 120 may comprise multiple computing elements, including file servers and database systems.

Publisher 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher 130 (and/or its affiliates). A content request may be a request that is immediately preceded by user input (e.g., selecting a hyperlink on web page) or may initiated as part of a subscription, such as through a Rich Site Summary (RSS) feed. In response to a request for content from a client device, publisher 130 provides the requested content (e.g., a web page) to the client device.

Simultaneously or immediately before or after the requested content is sent to a client device, a content request is sent to content delivery exchange 120. That request is sent (over a network, such as a LAN, WAN, or the Internet) by publisher 130 or by the client device that requested the original content from publisher 130. For example, a web page that the client device renders includes one or more calls (or HTTP requests) to content delivery exchange 120 for one or more content items. In response, content delivery exchange 120 provides (over a network, such as a LAN, WAN, or the Internet) one or more particular content items to the client device directly or through publisher 130. In this way, the one or more particular content items may be presented (e.g., displayed) concurrently with the content requested by the client device from publisher 130.

Content delivery exchange 120 and publisher 130 may be owned and operated by the same entity or party. Alternatively, content delivery exchange 120 and publisher 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 120, and that bids for space (on one or more publishers, such as publisher 130) to present content items on behalf of multiple content providers. Thus, a bidder is another source of content items that content delivery exchange 120 may select for presentation through publisher 130. Thus, a bidder acts as a content provider to content delivery exchange 120 or publisher 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery exchange 120. A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view the set of content items, select or click on the set of content items, or when a certain number of users purchase a product/service associated with the content delivery campaign or fill out a particular form on a website.

A content delivery campaign may specify one or more targeting criteria that are used to determine whether to present a content item of the content delivery campaign to one or more users. Example factors include date of presentation, time of day of presentation, characteristics of a user to which the content item will be presented, attributes of a computing device that will present the content item, identity of the publisher, etc. Examples of characteristics of a user include demographic information, residence information, job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 120 receives, from a computing device, a request that does not satisfy the targeting criteria, then content delivery exchange 120 ensures that any content items associated with the particular content delivery campaign are not sent to the computing device.

Thus, content delivery exchange 120 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery campaign 120 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher 130 may not satisfy targeting criteria of one content item of a campaign, the same content request may satisfy targeting criteria of another content item of the campaign.

Different content delivery campaigns that content delivery exchange 120 manages may have different charge models. For example, content delivery exchange 120 may charge one content delivery campaign for each presentation of a content item from the content delivery campaign (referred to herein as cost per impression or CPM). Content delivery exchange 120 may charge another content delivery campaign for each time a user interacts with a content item from the content delivery campaign, such as selecting or clicking on the content item (referred to herein as cost per click or CPC). Content delivery exchange 120 may charge another content delivery campaign for each time a user performs a particular action, such as purchasing a product or service, downloading a software application, or filling out a form (referred to herein as cost per action or CPA). Content delivery exchange 120 may manage only campaigns that are of the same type of charging model or may manage campaigns that are of any combination of the three types of charging models.

Entity Accounts

Although not depicted in FIG. 1, content delivery exchange 120 may be affiliated with (e.g., operates) a service that manages accounts that includes information about multiple entities, including users, user groups, universities, colleges, secondary schools, business organizations, civic organizations, government organizations, and philanthropic organizations. Content delivery exchange 120 has (e.g., near real-time) access to data managed by that service.

The service may be hosted by multiple computing elements, including an account manager and an account database. The account manager receives account data from computing devices over a network, where the account data is input by users (e.g., selecting characters on a physical or graphical keyboard) operating the computing devices. In response, the account manager creates and maintains accounts on behalf of the users of the computing devices. Additionally, the account manager may update accounts not only based on data provided by the users through the computing devices, but also by analysis of the data provided by the users and data that describes online activity of the users. For example, the account manager (or another component) may determine a geographic location of a user based on an IP address of a computing device that the user employs to interact with server system and store that geographic location in association with the user's account.

The account database comprises information about multiples accounts. The account database may be stored on one or more storage devices (persistent and/or volatile) that may reside within the same local network or may be distributed over many networks.

Social Network Service

In the social network context, the service that maintains entity accounts is a social network service is provided by a social network provider, such as LinkedIn, Facebook, or Google+. In this context, each account in the account database includes an entity profile, each provided by (or generated for) a different entity. In the context of users, an entity's profile may include a first name, last name, an email address, residence information, a mailing address, a phone number, one or more educational institutions attended, one or more current and/or previous employers, one or more current and/or previous job titles, a list of skills, a list of endorsements, and/or names or identities of friends, contacts, connections of the user, and derived data that is based on actions that the user has taken. Examples of such actions include jobs to which the user has applied, views of job postings, views of company pages, public messages, articles, or other content that the user posted and that are visible to users outside of the user's social network (but that are registered users/members of the social network provider).

Some data within a user's profile (e.g., work history) may be provided by the user while other data within the user's profile (e.g., skills and endorsement) may be provided by a third party, such as a "friend," connection, colleague of the user.

The social network service may prompt users to provide profile information in one of a number of ways. For example, the social network service may have provided a web page with a text field for one or more of the above-referenced types of information. In response to receiving profile information from a user's device, the social network service stores the information in an account that is associated with the user and that is associated with credential data that is used to authenticate the user to the social network service when the user attempts to log into social network service at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

In an embodiment, some information in a user profile is determined automatically by the social network service (or another computing entity). For example, a user specifies, in his/her profile, a name of the user's employer. The social network service can determine, based on the name, where the employer and/or user is located. If the employer has multiple offices, then a location of the user may be inferred based on an IP address associated with the user when the user registered with a social network service (e.g., provided by social network service) and/or when the user last logged onto the social network service. As another example, a user operating a computing device may perform a user action relative to a digital entity represented by the social network service, such as establishing a connection with another user/member of social network service, "following" a company or user online, posting an article online, providing a comment on an online article, "liking" another person's online article or comment, viewing an online job posting or job board, applying for a job through server system, etc.

While many examples herein are in the context of social networks, embodiments are not so limited. Another example context an online marketplace where users purchase various goods or services provided by one or more entities, whether (e.g., business) organizations or individual users. Such buyers and sellers may maintain account information that is accessible to content delivery exchange 120.

Multiple Data Sources

Identifying relevant content items to present to users on their respective computing devices is the subject of past and present research. The more relevant the content that a content provider provides, the more satisfied users will be and, as a result, the more likely those users will return for more content from that provider in the future. One source of data that a content provider can leverage to determine relevant content for a user is any information known about the user that will view the content, such as which web pages the user has visited in the past, which content items the user has viewed, selected or otherwise interacted with, and a profile (e.g., a social network profile) that the user provided. Such information may be analyzed and stored in a format that is searchable and that content providers (or content exchanges) can use to specify which users (in terms of user characteristics) are to receive which content items.

In a complex distributed computing system, targeting data can come from multiple data sources, such as a database of user profiles, a database of user actions, and databases of different analytics that can be performed on those and other sources. Different teams are responsible for providing targeting data for end-users. Each team usually organizes their respective data as a taxonomy, and maps text values provided by users to unique IDs in the taxonomy. This process is called standardization. For instance, if a user specifies their job title as "UI engineer", then "UI engineer" can be standardized to title ID "123". The standardized data is generated for members and stored in data stores.

On the content delivery campaign side, content providers also have access to standardized targeting data and can define their target audience accordingly. The audience targeting criteria may be captured as a Boolean expression defined based on standardized IDs. In addition to online stores, IDs may also be stored in offline streams to be used by offline (e.g., Hadoop) jobs.

Taxonomy

A taxonomy for a particular targeting criterion (or facet) is a set of data elements that can be used by content providers to target certain users that are associated with a data element in the set of data elements. A taxonomy may exist for job title, another taxonomy may exist for current or past employer, another taxonomy may exist for geographic region, and another taxonomy may exist for skills. For example, a taxonomy for job titles may include "UX designer," "software engineer," "CTO," and "programmer."

A taxonomy may map each data element to an identifier. An identifier may be a set of numeric-only characters (e.g., "1234"), a string of alphanumeric characters, or other set of characters. Different data elements may be mapped to the same identifier, indicating that the different data elements mean the same or are sufficiently similar to be treated as identical. For example, "software engineer" and "programmer" may map to the same identifier. Thus, all user profiles that include either "software engineer" or "programmer" as a job title will be mapped to the same identifier for the targeting data of the corresponding users. (The targeting data of a user may be stored in or in association with the user's profile.) Also, content providers that specify "software engineer" or "programmer" will also be mapped to the same identifier in targeting criteria of the corresponding content delivery campaigns. Alternatively, content delivery exchange 120 may not allow content providers to select "programmer" as a job title targeting criterion.

Taxonomy Changes

Over time, as industries evolve, new targeting criteria (e.g., new job titles, new skills, etc.) emerge and old targeting criteria may be deprecated or remapped. Hence, the targeting platform needs to be updated to use new IDs. Updating a targeting platform is a challenging task for several reasons. First, taxonomy IDs are used in many data stores and (e.g., Hadoop) files and it is tedious and error prone to clean them up. Second, as the patching is in progress, users and/or content providers may also change their information. Hence, the latest data may be overwritten by patched data. This issue is referred to "race condition" in the industry. Third, it is impossible to migrate old IDs (from both member targeting data and targeting criteria specified in campaigns) to new IDs at the same time because the old IDs are used by different systems. This lag in migration can cause a campaign's audience to shrink during data migration, which has a negative impact on revenue.

When taxonomies are modified, three types of changes may be applied to them: (1) new entities/IDs are added, (2) old entities/IDs are deprecated, and (3) existing entities/IDs are remapped to other existing entities/IDs because they represent the same entity. The following is an example taxonomy for the job title entity:

| Entity (Job Titles) | ID |
|---|---|
| UI engineer | 123 |
| UI developer | 456 |
| employee | 789 |

A job title taxonomy may be updated for various reasons: (1) there are new job titles in the industry, (2) feedback (e.g., from customers) that indicate that some job titles are the same, and (3) for regulatory reasons some titles should be deprecated or removed.

For example, given the above example taxonomy, it may be determined that UI developer and UI engineer are too similar or are considered synonymous. Accordingly, content providers (e.g., advertisers and/or recruiters) may suggest that those two job titles should be merged. As a result, "UI developer" is removed from the taxonomy and "UI engineer" is retained. Additionally, it may be determined that the "employee" job title does not provide much value since no or very few content providers use that job title in their targeting criteria or very few users include that job title in their profiles. Thus, that job title is removed. Additionally, it may be determined that new titles "iOS engineer" and "data scientist" have emerged in the industry in recent years. Therefore, those new titles should be added. With the above changes, the new taxonomy is as follows:

| Entity (Job Title) | ID |
|---|---|
| UI engineer | 123 |
| iOS developer | 1000 |
| data scientist | 2000 |

To apply changes to a taxonomy, a taxonomy delta indicating the changes is first captured. A taxonomy delta indicates which IDs are added, deprecated, and remapped. For example, the above taxonomy updates may be captured in the following delta file:

| Old label | Old ID | New label | New ID |
|---|---|---|---|
| UI developer | 456 | UI engineer | 123 |
| employee | 789 | — | — |
| | | iOS developer | 1000 |
| | | data scientist | 2000 |

The above format indicates that "UI developer" is mapped to "UI engineer". "employee" is deprecated, and two new titles ("iOS developer" and "data scientist") are added.

As noted previously, the targeting IDs are used in both user targeting data and campaign targeting criteria. Due to system performance issues, it is not possible to update all affected data sources (e.g., databases) at once because such a simple approach triggers a significant number of events to downstream services. The update to the different data sources should be gradual. For example, it may take days or even weeks to update all affected records. Given this requirement, there is a risk that some campaigns will not be served during the transition. For example, multiple campaigns are targeting users that have a particular job title. To update the user profiles and the particular campaign to the new taxonomy, job title "UI developer" is changed to "UI engineer" in both sets of records. Because the updates cannot be synced (they are stored in two types of databases, with different ownership and different rate of update), user records may get changed to "UI engineer" before the campaign records are likewise changed. As a result, at least some of the content delivery campaigns will not match the profiles of some of the users for the duration of transition, which make take up to several weeks. Such a mismatch may cause a significant negative revenue impact.

General Overview

Techniques are provided for applying taxonomy changes to multiple data sources involved in content matching. In one technique, the update of one data source is decoupled from the update of another data source. The first data source that is updated is updated to include both the old targeting value and the new targeting value. In this way, users that are targeted by affected content delivery campaigns will still be targeted before and after the first data source is updated.

In another technique, when updating a campaign database, a race condition is minimized by placing an expression transformer (that has access to remappings) in a campaign manager service that is accessed by content providers when the content providers update their respective content delivery campaigns. The expression transformer is invoked when the content providers access the campaign manager service and when an internal process that has access to identifiers of affected campaigns calls the expression transformer. In this way, campaigns affected by a remapping are ensured to be updated.

Avoiding Content Mismatches

In an embodiment, to mitigate the problem of a mismatch when a taxonomy delta is applied to multiple data sources, the update of the user (or entity) database (that contains records of users with the old targeting identifier) is decoupled from the update of the campaign database (that contains records of content delivery campaigns that target the old identifier). Specifically, records from one data source are updated to include both the old targeting data and the new targeting data before updating records from the other data source.

Figure 2:
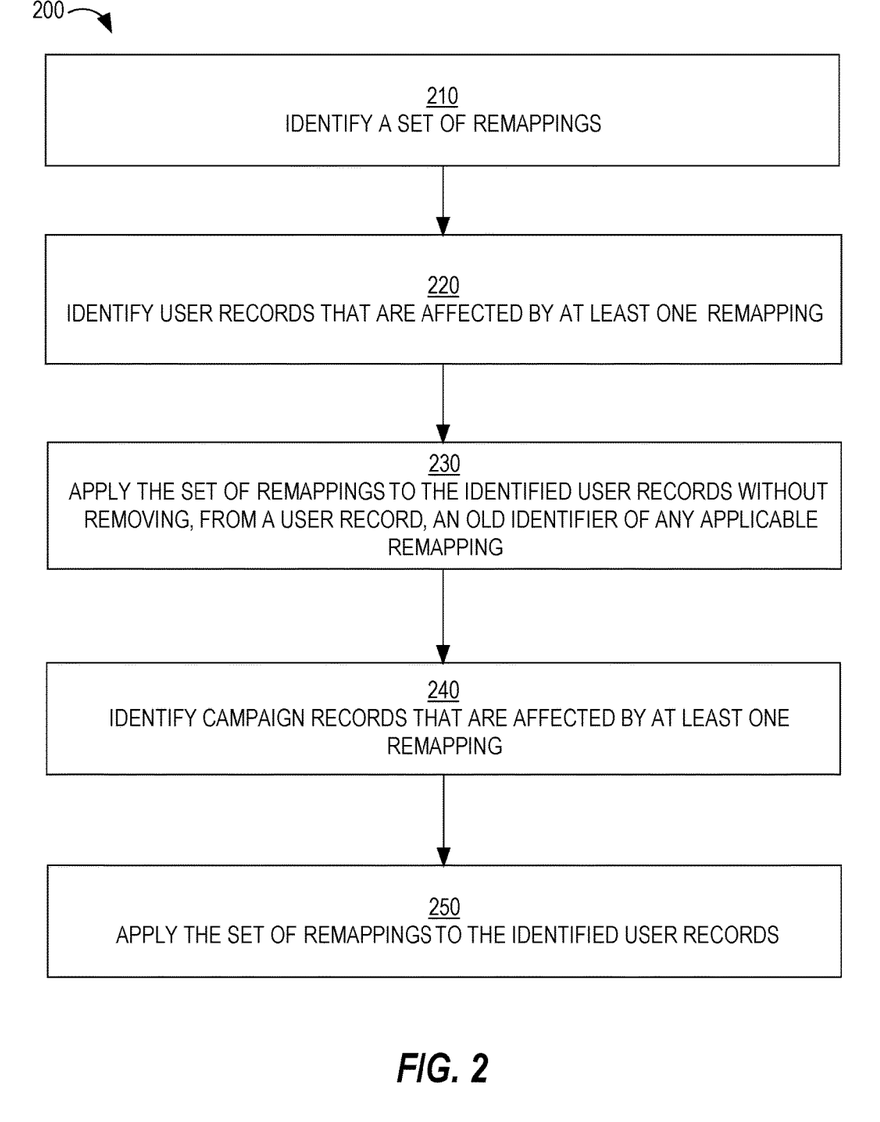
FIG. 2 is a flow diagram that depicts a process for updating targeting information in multiple data sources in response to changes to a taxonomy, in an embodiment.

FIG. 2 is a flow diagram that depicts a process 200 for updating targeting information in multiple data sources in response to changes to a taxonomy, in an embodiment.

At block 210, a set of remappings is identified. Each remapping maps an old targeting data item (hereinafter "old identifier") in a first (or prior) version of the taxonomy to a new targeting data item (hereinafter "new identifier") in a second (or current) version of the taxonomy. A remapping is an association between two data elements (or a duple) where one data element is an old identifier and the other data element is a new identifier. A remapping indicates that an old identifier is to be replaced with a new identifier.

The set of remappings may be created manually or automatically by comparing the first version of the taxonomy with the second version of the taxonomy. For example, a machine learning technique (e.g., a clustering algorithm) is implemented to cluster some IDs together. Then a human (e.g., a taxonomy specialist) reviews the clusters and decides which IDs should be used as the base. Then the rest of IDs are marked as remapped. In this way, the system distinguishes between a normal deletion and addition vs. a remapping. In this example, a combination of a machine learning technique and a taxonomy specialist is employed.

At block 220, a search of a data source of user records is performed to identify user records that contain at least one old identifier in the set of remappings. Each user record contains targeting data associated with the corresponding user. The search may involve a scan of one user record at a time. The search may be parallelized such that different processes are assigned to different sets of user records, each process considering each remapping for each user record. Alternatively, the search may involve leveraging one or more indexes to identify the user records, where an index is keyed based on a targeting facet of one of the old identifiers in the set of remappings. For example, an index on job titles exists and is used to identify user records that contains job titles that match an old identifier in the set of remappings.

The following is an example of the state of a user record with member ID 111 and a campaign record with a campaign ID 999, prior to block 230:

member 111: title: UI developer
campaign 999: title: UI developer

At block 230, for each identified user record that is affected by at least one remapping, the remapping is applied to that user record. Applying a remapping to a user record in this block does not remove the old identifier. Instead, the updated user record contains both the old identifier and the new identifier. In this way, (1) content delivery campaigns that target the old identifier will still be able to have their respective content items delivered to users associated with the updated user records and (2) content delivery campaigns that target the new identifier will be able to have their respective content items delivered to the same users.

The following is a continuation of the example above indicating the state of the user record and the campaign record after block 230 (i.e., when the user record is updated based on a remapping):

member 111: title: UI developer, UI engineer
campaign 999: title: UI developer

If the user record was updated such that the old job title was removed, then campaign 999 would not be able to target the corresponding user.

Because there might be multiple remappings in the set of remappings, a single user record may be updated based on multiple remappings indicated in or derived from a taxonomy delta.

At block 240, a search of a data source of campaign records is performed to identify campaign records that contain at least one old identifier in the set of remappings. The search may involve a scan of one campaign record at a time. The search may be parallelized such that different processes are assigned to different sets of campaign records, each process considering each remapping for each campaign record. Alternatively, the search may involve leveraging one or more indexes to identify the campaign records, where an index is keyed based on a targeting facet of one of the old identifiers in the set of remappings. For example, an index on job titles exists and is used to identify campaign records that contain job titles that match an old identifier in the set of remappings.

At block 250, for each identified campaign record that is affected by at least one remapping, the remapping is applied to that campaign record. Applying a remapping to a campaign record in this block may involve removing the old identifier, such that, after the update, the updated campaign record does not contain the old identifier. Thus, all content delivery campaigns that targeted users associated with the old identifier before block 250 will still target those same users.

The following is a continuation of the example above indicating the state of the user record and the campaign record after block 250 (i.e., when the campaign record is updated based on a remapping):

member 111: title: UI developer, UI engineer
campaign 999: title: UI engineer

Because there might be multiple remappings in the set of remappings, a single campaign record may be updated based on multiple remappings indicated in or derived from a taxonomy delta.

At block 260, the identified user records that have been updated in block 230 are updated again to remove the old identifier. Block 260 may involve a search of user records, similar to block 220, such that all user records that are affected by at least one remapping in the set of remappings are identified. If a user record contains an old identifier in a remapping, then the old identifier is removed from the user record. Block 260 may be performed serially or in parallel.

The following is a continuation of the example above indicating the state of the user record and the campaign record after block 250 (i.e., when the campaign record is updated based on a remapping):

member 111: title: UI engineer
campaign 999: title: UI engineer

Block 260 might be performed only after block 250 is completed for all content delivery campaigns affected by one or more remappings in the set of remappings. In this way, it is ensured that no user that was targeted using an old identifier will be untargetable by a content delivery campaign that is affected by a remapping in the set of remappings.

With process 200, at no point in time is content matching (which involves comparing campaign targeting criteria to targeting data of a user) affected. Also, negative revenue impact is avoided despite how long it might take to migrate each database.

In a related embodiment, in the scenario where there are multiple remappings to apply, blocks 220-260 are repeated, but only for one remapping at a time. Thus, blocks 220-260 are performed the same number of times as there are number of remappings.

Race Condition Avoidance

As noted previously, a race condition may arise when updating campaign records because content providers may be attempting to update targeting criteria of their respective content delivery campaigns at the same time. For example, a content provider requests targeting criteria of their content delivery campaign, which causes the targeting criteria to be read from storage. Then, the targeting criteria is updated based on a remapping. Subsequently, the content provider modifies the old targeting criteria and causes the modified targeting criteria to be stored, which effectively overwrites the new identifier of the remapping with the old identifier from the original targeting criteria that was read from storage.

Figure 3:
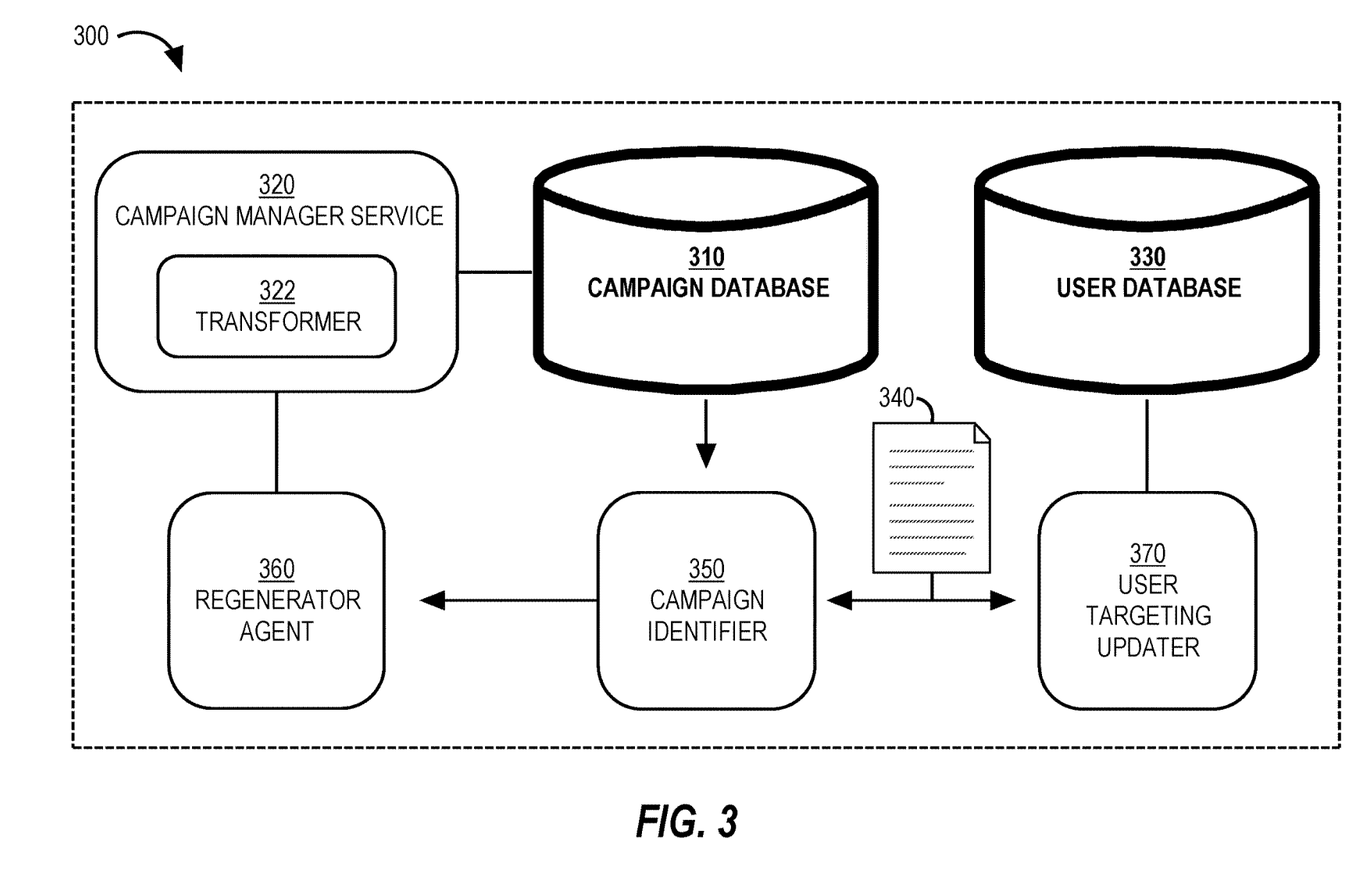
FIG. 3 is a block diagram that depicts a system for avoiding race conditions when applying taxonomy changes to targeting criteria of content delivery campaigns, in an embodiment.

FIG. 3 is a block diagram that depicts a system 300 for avoiding race conditions when applying all types of changes, including remappings, to targeting criteria of content delivery campaigns, in an embodiment. System 300 includes a campaign database 310, a campaign manager service 320, a user (or entity) database 330, a taxonomy delta 340, a campaign identifier 350, a regenerator agent 360, and a user targeting updater 370. Each of campaign manager service 320, campaign identifier 350, and regenerator agent 360 is implemented in software, hardware, or any combination of software and hardware.

Campaign database 310 comprises data about multiple content delivery campaigns, including their respective targeting criteria. User database 330 comprises targeting data about multiple users. User database 330 may comprise other (non-targeting) data about multiple users or non-standardized data. For example, user database 330 may include in a particular user's record, (1) a job title that the particular user provided/specified and which is displayed in the user's profile to the particular user and to other users who view the particular user's profile (but which job title is not used as targeting data) and (2) a standardized version (e.g., an identifier) of the job title, which is used as targeting data. Alternatively, user targeting data is stored physically separate from (e.g., in different storage devices than) user profile data.

Content providers interact with campaign manager service 320 to create, update (e.g., modify targeting criteria), and manage content delivery campaigns on behalf of content providers. Campaign manager service 320, in response to instructions initiated by a content provider through a remote computing device, causes data to be read from and data to be written to campaign database 310. Campaign manager service 320 may transmit, to the remote computing device, a graphical user interface through which a user operating the computing device can specify, modify, or delete attributes of a content delivery campaign, including targeting criteria.

Campaign manager service 320 includes a transformer 322. Transformer 322 applies one or more remappings to targeting criteria of a content delivery campaign by replacing, in the targeting criteria, (a) an old identifier indicated in a remapping with (b) a new identifier indicated in the remapping.

Figure 4:
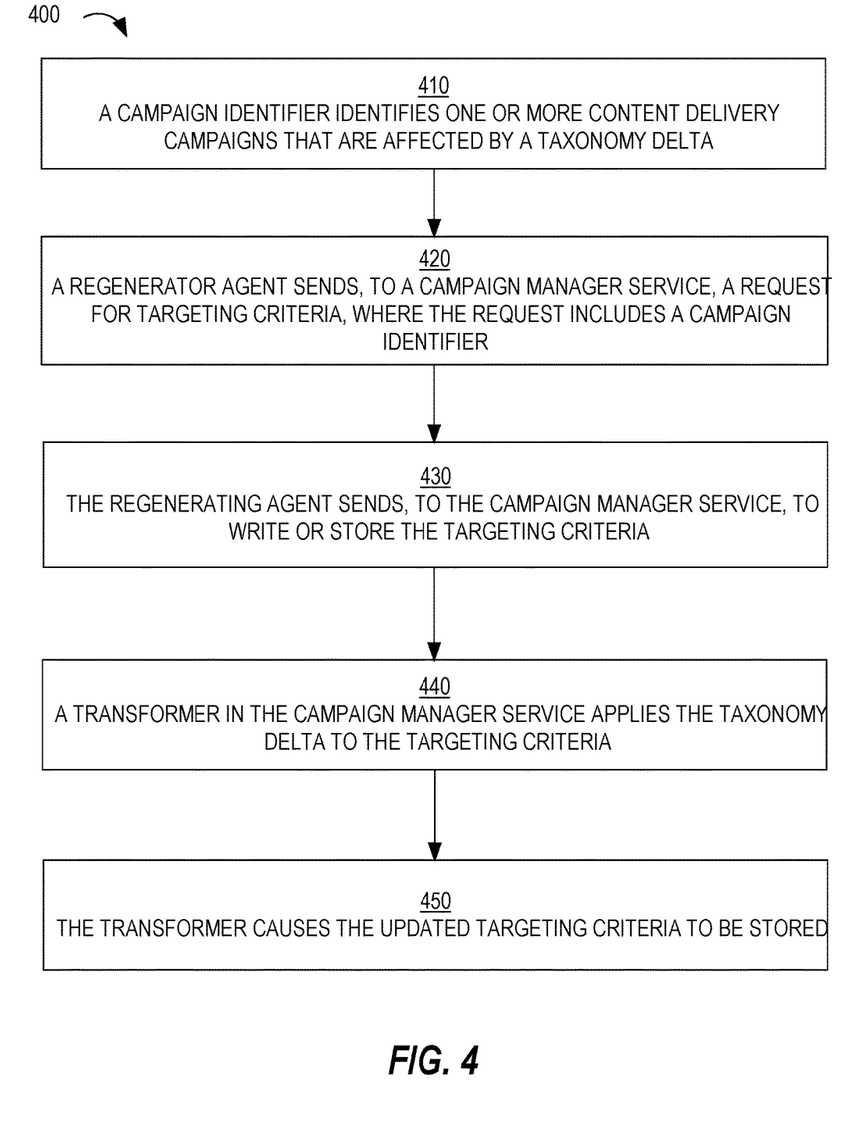
FIG. 4 is a flow diagram that depicts a process for avoiding race conditions when applying taxonomy changes to targeting criteria of content delivery campaigns, in an embodiment.

FIG. 4 is a flow diagram that depicts a process 400 for avoiding race conditions, in an embodiment. Process 400 is described in the context of the elements of system 300. While process 400 is described is in the context of applying a remapping, embodiments may include applying additions and deletions as well.

At block 410, campaign identifier 350 identifies one or more content delivery campaigns that are affected by taxonomy delta 340. Thus, campaign identifier 350 takes campaign data from campaign database 310 and taxonomy delta 340 as input. Taxonomy delta 340 may have additions and deletions in addition to one or more remappings. Thus, some of the content delivery campaigns that campaign identifier 350 identifies may not be affected by a remapping, but by only deletions and/or additions.

In an embodiment, taxonomy delta 340 comprises multiple taxonomy deltas, each taxonomy delta corresponding to a different targeting facet or type of targeting criterion.

For example, one taxonomy delta may be for changes to job titles and another taxonomy delta may be for changes to industry names.

Campaign identifier 350 may read campaign data (including targeting criteria) of one campaign at a time from campaign database 310. Alternatively, another process performs an ETL (extract-transform-load) operation on campaign data from campaign database 310 and stores (or loads) the extracted campaign data in separate storage, such as a file system, an example of which is HDFS (or Hadoop Distributed File System). Taxonomy delta 340 may also be stored in the same storage (e.g., file system) as the campaign data.

Campaign identifier 350 identifies and stores a campaign identifier for each content delivery campaign that campaign identifier 350 identifies based on taxonomy delta 340. A campaign identifier may be any set of alphanumeric characters or even a hash of a set of alphanumeric characters. A campaign identifier uniquely identifies a content delivery campaign from each other content delivery campaign.

Regenerator Agent

The set of campaign identifiers that campaign identifier 350 creates is passed to regenerator agent 360. For example, campaign identifier 350 creates an event (e.g., a Kafka event) with a particular type or topic to which regenerator agent 360 has subscribed. Thus, regenerator agent 360 "listens" to events that specify one or more campaign identifiers. Each event may specify a single campaign identifier or multiple campaign identifiers. Apache Kafka is an open-source stream processing platform developed by the Apache Software Foundation and written in Scala and Java. The platform provides a unified, high-throughput, low-latency platform for handling real-time data feeds. The platform's storage layer is a scalable pub/sub message queue architected as a distributed transaction log, making the platform highly valuable for enterprise infrastructures to process streaming data.

As another example, instead of relying on a publish-subscribe system, campaign identifier 350 calls an API (application programming interface) of regenerator agent 360 and passes, as part of the API call, the set of campaign identifiers.

Regenerator agent 360 causes targeting criteria associated with affected content delivery campaigns to be updated based on taxonomy delta 340. Regenerator agent 360 simulates a content provider that submits requests for targeting criteria associated with a content delivery campaign and updates or modifies the targeting criteria. Regenerator agent 360 does this to ensure that all affected content delivery campaigns are updated based on taxonomy delta 340. Otherwise, it is likely that targeting criteria of at least some content delivery campaigns will not be updated because at least some content providers will not be accessing their respective content delivery campaigns while the campaigns are active.

At block 420, regenerator agent 360 sends, to campaign manager service 320, a request for targeting criteria, where the request includes a campaign identifier. The request may comprise an API call to read targeting criteria associated with the campaign identifier. Alternatively, the request may comprise a simulated selection of a user interface element, similar to a user interface element that is presented to a user representative of a content provider who is creating or updating a content delivery campaign through a user interface provided by campaign manager service 320.

In response to the request, campaign manager service 320 retrieves, from campaign database 310, targeting criteria associated with the campaign identifier. Campaign manager service 320 responds to the request by sending the targeting criteria to regenerator agent 360.

At block 430, regenerator agent 360 then sends a request to write or store the targeting criteria. Importantly, regenerator agent 360 does not modify the targeting criteria. Again, the request to write/store may be an API call or a UI call. In response to receiving the write request, transformer 322 intercepts campaign manager service 320's attempt to write the targeting criteria to campaign database 310.

In a related embodiment, instead of campaign manager service 320 passing the targeting criteria to regenerator agent 360, only for the regenerator agent 360 to pass the targeting criteria back to campaign manager service 320, campaign manager service 320 may be configured to determine that the request is from an internal (with respect to content delivery exchange 120) process and, thus, does not need to send the targeting criteria to regenerator agent 360. This determination may be based on sender data that indicates a sender or source of the request, where campaign manager service 320 stores data that indicates if a request is from a particular sender, then the targeting data does not have to be delivered to the sender. In this embodiment, transformer 322 is activated and has access to the campaign identifier that regenerator agent 360 transmitted to campaign manager service 320.

Transformer

At block 440, transformer 322 retrieves taxonomy delta 340 (or a different instance of taxonomy delta 340, which instance is stored in an online store that is accessible to campaign manager service 320). Alternatively, transformer 322 may first check local storage to retrieve the taxonomy delta before retrieving the taxonomy delta from another data store. After retrieving the taxonomy delta, transformer 322 then modifies the targeting criteria based on the entries in the taxonomy delta that are applicable to the targeting criteria.

For example, for each entry in a taxonomy delta, transformer 322 compares the entry to the corresponding targeting criterion in a set of targeting criteria of a particular campaign. For example, an entry in the taxonomy delta may be a job title remapping. Transformer 322 determines that the entry relates to a job title remapping and compares the old identifier in the entry to a job title indicated in the targeting criteria (e.g., without having to compare the old identifier to all identifiers/entries in the targeting criteria). If there is a match, then transformer 322 replaces the job title in the targeting criteria with the new identifier indicated in the remapping. Else, another entry in the taxonomy delta is considered.

Transformer 322 may include logic that determines whether all targeting criteria of a particular type (e.g., job titles) have been updated for a particular content delivery campaign. If so, then transformer 322 no longer checks the taxonomy delta for any further entries corresponding to changes of that type.

At block 450, after transformer 322 applies the appropriate changes indicated in taxonomy delta 340 (or a copy thereof) to targeting criteria of a content delivery campaign, transformer 322 causes the updated targeting criteria to be stored in campaign database 310 in association with the campaign identifier of that campaign. For example, transformer 322 causes the write/store request that transformer 322 intercepted from campaign manager service 320, along with the changed targeting criteria and the corresponding campaign identifier, to be sent to campaign database 310. Alternatively, transformer 322 generates a write/store request with the appropriate content and sends that request to campaign database 310. Either way, campaign database 310 may comprise a server that receives the request, uses the campaign identifier to identify a memory location of where the targeting criteria is stored, and writes the updated targeting criteria to the memory location.

In an embodiment, regenerator agent 360 causes transformer 322 to be activated once for each campaign identifier that regenerator agent 360 passes to campaign manager service 320. Thus, for example, if campaign identifier 350 identified fifty content delivery campaigns that are affected by taxonomy delta 340, then regenerator agent 360 calls campaign manager service 320 fifty times and transformer 322 intercepts fifty write requests and updates each of the fifty content delivery campaigns.

In an embodiment, only one copy of transformer 322 exists in system 300 and, consequently, transformer 322 is easier to update and maintain.

A significant benefit of placing the transformer 322 in campaign manager service 320 (as opposed to regenerator agent 360) can be appreciated in the scenario where a content provider updates targeting criteria of a campaign around the time that regenerator agent 360 causes targeting criteria to be written back to campaign database 310. In this scenario, any changes by the content provider to the targeting criteria will not be overwritten; instead, only entries from taxonomy delta 340 are applied to the targeting criteria. This is a benefit in contrast with traditional patching of databases where a database dump is used to generate the updated targeting criteria. In this traditional approach, if a content provider separately updates targeting criteria, then the patch may overwrite the provider's updates with obsolete targeting criteria.

As noted previously, system 300 includes user targeting updater 370. User targeting updater 370 updates user records from user database 330 (that are affected by taxonomy delta 340) prior to process 400 being performed relative to affected campaign targeting criteria. Like campaign identifier 350, user targeting updater 370 may be implemented as a Hadoop job that takes, as input, taxonomy delta 340 and user targeting data from user database 330. After user records are identified and updated, user targeting updater 370 causes the updated user records to be stored in user database 330.

There may be a risk of a race condition for user targeting data, similar to campaign targeting data. There could be multiple implementation options depending on any near real-time requirement. If near real-time profile update is a requirement, then a race condition becomes an issue on the user side as well and needs to be addressed. In the case where user profiles do not need to be updated in near real-time, user profile changes could be applied on a copy/snapshot of user data generated daily. If a user changes his/her profile, then the transformations are applied the next day to the updated profile.

In another implementation (more generalized one with near real-time profile update support), a race condition would become a more prominent issue. In that case, similar to the campaign side approach, first the user IDs whose profile need to be updated should be identified. Then a regenerator agent applies the changes by calling a profile service (one read, and one write back). This would trigger a user side transformer to apply the user side changes. This approach would prevent race condition on the user side.

In an embodiment, user targeting updater 370 (or another computing element) receives user targeting data from one or more other sources before causing the updated user records to be saved to user database 330.

Benefits

Benefits of some embodiments described herein for updating a taxonomy in a multi-database environment include preventing performance issues, race conditions, and revenue loss. These benefits are achieved through the following:

A possible performance issue of applying data changes too fast (e.g., in a DB patch) involves creating a ripple effect throughout the system (such as databus events from campaign database 310 overwhelming the content serving index and decreasing its performance/responsiveness). To avoid performance issues, the rate of applying updates to the different databases can be slowed. Because the user side changes are decoupled from campaign side changes, there is no rush to finish all the updates quickly. However, this alone increases risk of race condition and revenue loss.

To avoid race condition, transformer 322 is incorporated into campaign manager service 320, so that transformation is triggered by day-to-day user actions as well as regenerator agent 360.

To avoid revenue loss, the changes to user database 330 is decoupled from the changes to campaign database 310 by stamping user data with old and new identifiers.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
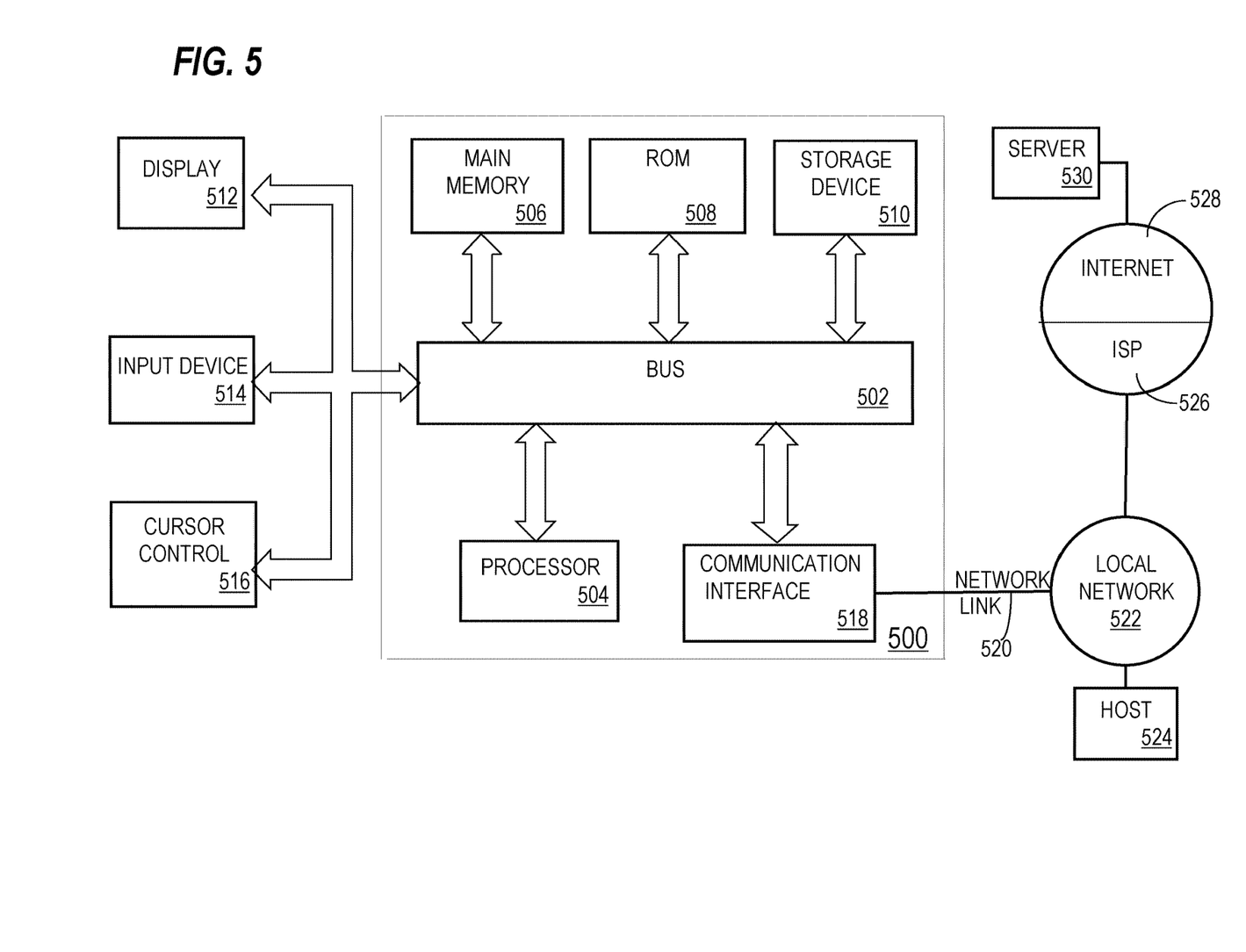
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A system comprising:
one or more processors;
one or more storage media storing instructions which, when executed by the one or more processors, cause:
identifying a plurality of content delivery campaigns that are affected by at least one remapping in a set of remappings;

wherein each remapping in the set of remappings maps an old identifier to a new identifier that is different than the old identifier, wherein the old identifier is from a first version of a taxonomy and the new identifier is from a second version of the taxonomy;

after identifying the plurality of content delivery campaigns, for each content delivery campaign in a subset of the plurality of content delivery campaigns:

sending, to a particular service, identification data that identifies said each content delivery campaign;

in response to the particular service receiving the identification data, retrieving, by the particular service, targeting data associated with said each content delivery campaign;

applying, by the particular service, a subset of the set of remappings to the targeting data to generate updated targeting data;

causing, by the particular service, the updated targeting data to be stored in association with said each content delivery campaign.

2. The system of claim 1, wherein the instructions, when executed by the one or more processors, further cause:

receiving, over a network from a client device that is remote relative to the system, by the particular service, a request associated with a particular content delivery campaign in the plurality of content delivery campaigns;

in response to receiving the request, the particular service determining whether one or more remappings in the set of remappings are to be applied to particular targeting data associated with the particular content delivery campaign;

in response to determining that a particular remapping in the set of remappings are to be applied to the particular targeting data associated with the particular content delivery campaign, applying the particular remapping to the particular targeting data.

3. The system of claim 2, wherein:

the request is to update first targeting data associated with the particular content delivery campaign to generate the particular targeting data;

applying the particular remapping comprises modifying the particular targeting data to generate updated particular targeting data;

the instructions, when executed by the one or more processors, further cause:

the particular service causing the updated particular targeting data to be durably stored.

4. The system of claim 1, wherein:

prior to identifying the plurality of content delivery campaigns, targeting data of multiple content delivery campaigns that includes the plurality of content delivery campaigns is retrieved from a database;

retrieving the targeting data associated with said each content delivery campaign comprises retrieving, by the particular service, from the database, the targeting data associated with said each content delivery campaign.

5. The system of claim 1, wherein the instructions, when executed by the one or more processors, further cause:

prior to updating any content delivery campaign in the plurality of content delivery campaigns based on any remapping in the set of remappings, updating, based on the set of remappings, entity targeting data of a plurality of entities;

wherein updating the entity targeting data comprises, for each entity of multiple entities:

determining whether targeting data of said each entity is affected by at least one remapping in the set of remappings;

in response to determining that the targeting data of said each entity is affected by the at least one remapping in the set of remappings, applying each remapping in the at least one remapping in to the targeting data without removing any data from the targeting data.

6. The system of claim 5, wherein the instructions, when executed by the one or more processors, further cause, after targeting data of each content delivery campaign in the plurality of content delivery campaigns is updated based on the subset of the set of remappings:

modifying the targeting data of each entity in the plurality of entities by removing an old identifier indicated in at least one remapping in the set of remappings.

7. A system comprising:

one or more processors;

one or more storage media storing instructions which, when executed by the one or more processors, cause:

identifying a set of remappings, wherein each remapping in the set of remappings maps an old identifier indicated in a first version of a taxonomy to a new identifier indicated in a second version of the taxonomy;

identifying a plurality of entities whose targeting data is affected by at least one remapping in the set of remappings;

after identifying the plurality of entities, for each entity in the plurality of entities:

updating the targeting data of said each entity based on one or more remappings in the set of remappings without removing any data from the targeting data;

only after the targeting data of each entity in the plurality of entities is updated based on one or more remappings in the set of remappings:

updating targeting criteria of each content delivery campaign in a plurality of content delivery campaigns, wherein the targeting criteria are affected by at least one remapping in the set of remappings;

after updating the targeting criteria of each content delivery campaign in the plurality of content delivery campaigns, removing at least one old identifier from the targeting data of each entity in the plurality of entities.

8. The system of claim 7, wherein the instructions, when executed by the one or more processors, further cause:

prior to updating the targeting data of a particular entity in the plurality of entities, combining data from multiple sources to generate the targeting data of the particular entity.

9. The system of claim 7, wherein the instructions, when executed by the one or more processors, further cause:

based on the set of remappings, identifying the plurality of content delivery campaigns as being affected by at least one mapping in the set of remappings;

wherein updating the targeting criteria comprises, for each content delivery campaign in the plurality of content delivery campaigns:

sending, to a particular service, identification data that identifies said each content delivery campaign;

in response to the particular service receiving the identification data, retrieving, by the particular service, the targeting criteria of said each content delivery campaign;

applying, by the particular service, a subset of the set of remappings to the targeting criteria to updated targeting criteria;
    causing, by the particular service, the updated targeting criteria to be stored in association with said each content delivery campaign.

10. A method comprising:

identifying a plurality of content delivery campaigns that are affected by at least one remapping in a set of remappings;

wherein each remapping in the set of remappings maps an old identifier to a new identifier that is different than the old identifier, wherein the old identifier is from a first version of a taxonomy and the new identifier is from a second version of the taxonomy;

after identifying the plurality of content delivery campaigns, for each content delivery campaign in a subset of the plurality of content delivery campaigns:
    sending, to a particular service, identification data that identifies said each content delivery campaign;
    in response to the particular service receiving the identification data, retrieving, by the particular service, targeting data associated with said each content delivery campaign;
    applying, by the particular service, a subset of the set of remappings to the targeting data to generate updated targeting data;
    causing, by the particular service, the updated targeting data to be stored in association with said each content delivery campaign;

wherein the method is performed by one or more computing devices.

11. The method of claim 10, further comprising:

receiving, over a network from a client device that is remote relative to a system that implements the method, by the particular service, a request associated with a particular content delivery campaign in the plurality of content delivery campaigns;

in response to receiving the request, the particular service determining whether one or more remappings in the set of remappings are to be applied to particular targeting data associated with the particular content delivery campaign;

in response to determining that a particular remapping in the set of remappings are to be applied to the particular targeting data associated with the particular content delivery campaign, applying the particular remapping to the particular targeting data.

12. The method of claim 11, wherein:

the request is to update first targeting data associated with the particular content delivery campaign to generate the particular targeting data;

applying the particular remapping comprises modifying the particular targeting data to generate updated particular targeting data;

the method further comprising the particular service causing the updated particular targeting data to be durably stored.

13. The method of claim 10, wherein:

prior to identifying the plurality of content delivery campaigns, targeting data of multiple content delivery campaigns that includes the plurality of content delivery campaigns is retrieved from a database;

retrieving the targeting data associated with said each content delivery campaign comprises retrieving, by the particular service, from the database, the targeting data associated with said each content delivery campaign.

14. The method of claim 10, further comprising:

prior to updating any content delivery campaign in the plurality of content delivery campaigns based on any remapping in the set of remappings, updating, based on the set of remappings, entity targeting data of a plurality of entities;

wherein updating the entity targeting data comprises, for each entity of multiple entities:
    determining whether targeting data of said each entity is affected by at least one remapping in the set of remappings;
    in response to determining that the targeting data of said each entity is affected by the at least one remapping in the set of remappings, applying each remapping in the at least one remapping to the targeting data without removing any data from the targeting data.

15. The method of claim 14, further comprising, after targeting data of each content delivery campaign in the plurality of content delivery campaigns is updated based on the subset of the set of remappings:

modifying the targeting data of each entity in the plurality of entities by removing an old identifier indicated in at least one remapping in the set of remappings.

16. The method of claim 14, further comprising:

prior to updating particular targeting data of a particular entity in the plurality of entities, combining data from multiple sources to generate the targeting data of the particular entity.

\* \* \* \* \*